US010025502B2

(12) United States Patent
Hong et al.

(10) Patent No.: US 10,025,502 B2
(45) Date of Patent: Jul. 17, 2018

(54) FIBRE CHANNEL INITIATOR ALIAS/PORT SUGGESTION AND AUTOCOMPLETE

(71) Applicant: HEWLETT PACKARD ENTERPRISE DEVELOPMENT LP, Houston, TX (US)

(72) Inventors: Luan Anh Hong, Raleigh, NC (US); Jason M. Fox, Cary, NC (US); Evan Chiu, Cary, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 328 days.

(21) Appl. No.: 15/060,454

(22) Filed: Mar. 3, 2016

(65) Prior Publication Data

US 2016/0259561 A1    Sep. 8, 2016

Related U.S. Application Data

(60) Provisional application No. 62/128,505, filed on Mar. 4, 2015.

(51) Int. Cl.
*G06F 3/06* (2006.01)
*G06F 13/40* (2006.01)
*G06F 13/42* (2006.01)

(52) U.S. Cl.
CPC .......... *G06F 3/0605* (2013.01); *G06F 3/0611* (2013.01); *G06F 3/0665* (2013.01); *G06F 3/0689* (2013.01); *G06F 13/4022* (2013.01); *G06F 13/426* (2013.01)

(58) Field of Classification Search
CPC ...... G06F 3/0605; G06F 3/067; G06F 3/0665; G06F 3/0689; G06F 3/0611
See application file for complete search history.

(56) References Cited

U.S. PATENT DOCUMENTS

2006/0026373 A1\* 2/2006 Kaneda ................. G06F 3/0622
                                                              711/162

\* cited by examiner

*Primary Examiner* — Ernest Unelus

(57) ABSTRACT

Storage arrays, methods and computer readable media are provided for obtaining alias assignments of initiators connected to a Fiber Channel (FC) fabric for configuration use on a storage array. One method includes generating a request from the storage array to a switch of the FC fabric to which the storage array is connected. The request is to obtain a copy of a world wide port name (WWPN) of an initiator that is connected to the FC fabric and a copy of an alias name for the initiator. The method includes receiving the WWPN and alias name of the initiator from the switch and caching the received WWPN and alias name to a database of the storage array. The method further includes processing a user interface by the storage array to enable selection of the initiator for assignment to a volume of the storage array. The user interface includes a selection control that identifies the initiator using the alias name received from the switch. In one example, an auto-fill function is used as part of the selection control.

27 Claims, 9 Drawing Sheets

Example: Fill WWPN, Alias auto match

Fig. 5C

Example: Fill Alias, WWPN auto match

Fig. 5F ent application claims priority as a nonprovisional of U.S. Provisional Application No. 62/128,505, filed on Mar. 4, 2015, and entitled "Fibre Channel Alias/Port Suggestion and Autocomplete," which is herein incorporated by reference.

FIBRE CHANNEL INITIATOR ALIAS/PORT SUGGESTION AND AUTOCOMPLETE

CLAIM OF PRIORITY

The present application claims priority as a nonprovisional of U.S. Provisional Application No. 62/128,505, filed on Mar. 4, 2015, and entitled "Fibre Channel Alias/Port Suggestion and Autocomplete," which is herein incorporated by reference.

FIELD OF DISCLOSURE

Embodiments of the disclosure provide for storage systems and methods that enable efficient identification of which initiators have been assigned to a storage array so that volume assignment can be completed.

BACKGROUND

Storage arrays, also referred to as network storage systems or storage systems, provide connected computer data storage to heterogeneous clients connected over a network. Typically storage arrays process a large amount of Input/Output (TO) requests for applications, are highly available, and require adequate network connection speeds. As is known, there are various networking standards used by storage arrays. Today, storage arrays most commonly utilize iSCSI or Fibre Channel (FC) communication protocols. Depending on end user applications, legacy infrastructure, and other considerations, one or the other protocol is selected.

If the Fibre Channel protocol is selected, the storage array, switches, hosts and other infrastructure will adhere to standard Fibre Channel conventions. These Fibre Channel conventions need to be managed to ensure proper interoperability. In Fibre Channel storage array configurations, there is a responsibility to properly generate, assign and manage World Wide Node Names (WWNNs) and World Wide Port Names (WWPNs) within a storage array, a pool of storage arrays, a group of storage arrays, etc. Typically, initiators connected to a FC fabric are assigned WWPNs as well. When administrators of storage arrays attempt to assign certain initiators to a volume of the storage array, the administrator must examine their WWPNs, in order to properly identify the initiators. Although this is common, WWPNs are hexadecimal numbers, which may introduce confusion. Unfortunately, human identification of long hexadecimal numbers is prone to human error, and/or requires more time to cross-check each of the digits.

It is in this context that embodiments arise.

SUMMARY

Embodiments of the disclosure provide for storage arrays, methods and computer readable media are provided for obtaining alias assignments of initiators connected to a Fibre Channel (FC) fabric for configuration use on a storage array. One method includes generating a request from the storage array to a switch of the FC fabric to which the storage array is connected. The request is to obtain a copy of a world wide port name (WWPN) of an initiator that is connected to the FC fabric and a copy of an alias name for the initiator. The method includes receiving the WWPN and alias name of the initiator from the switch and caching the received WWPN and alias name to a database of the storage array. The method further includes processing a user interface by the storage array to enable selection of the initiator for assignment to a volume of the storage array. The user interface includes a selection control that identifies the initiator using the alias name received from the switch. In one example, an auto-fill function is used as part of the selection control.

In some embodiments, the user interface further includes a data field that identifies the WWPN for the initiator that is mapped to the alias name.

In some embodiments, the request is processed automatically by the storage array to maintain a list of alias names current for the initiator and other initiators connected to the FC fabric.

In some embodiments, the request is processed automatically at periodic intervals.

In some embodiments, the request is processed each time the storage array detects a login attempt by at least one other initiator.

In some embodiments, the request is an application programming interface (API) call triggered by a driver process of the storage array.

In some embodiments, the WWPN is a hexadecimal number and the alias name is a descriptive identifier of the initiator.

In some embodiments, the database of the storage array holds configuration data for the storage array, the configuration data includes the WWPN and alias name received from the switch, and further comprises refreshing the configuration data of the storage array by receiving one or more WWPNs and alias names for one or more initiators or updates to the alias name of the initiator.

In some embodiments, the user interface includes an auto-fill function that provides options of alias names for selection, and each of the options of alias names provided are alias names received from the switch in response to the request and cached in the database of the storage array.

In some embodiments, the initiator is associated to a group of initiators, and the group of initiators is associated to a volume using an access control interface of the user interface of the storage array.

In some embodiments, each initiator in the group of initiators is presented on a screen of the user interface with corresponding WWPNs and alias names, wherein the corresponding WWPs and alias names are gathered automatically from the FC fabric via a process of the storage array.

In some embodiments, the alias name for the initiator was created via the switch of the FC fabric.

In another embodiment, a storage array for providing storage to initiators of via a Fibre Channel (FC) fabric is provided. The storage array includes a controller for processing access to volumes of a storage array, a database storage for holding configuration data of the storage array and a processor of the controller. The process is configured for generating a request from the storage array to a switch of the FC fabric to which the storage array is connected. The request is to obtain a copy of world wide port names (WWPNs) of initiators that are connected to the FC fabric and a copy of alias names for the initiators. The processor is configured to cache received WWPNs and alias name to the database storage of the storage array. The processor of the controller provides a user interface to enable selection of an initiator for assignment to a volume of the storage array. The user interface includes a selection control that identifies the initiator using the alias name received from the switch of the FC fabric.

In some embodiments, the user interface further includes a data field that identifies the WWPN for the initiator that is mapped to the alias name, wherein the request is processed automatically to maintain current the alias names for the initiators connected to the FC fabric.

In some embodiments, the request is an application programming interface (API) call triggered by a driver process executed by the processor of the storage array.

In some embodiments, the storage array provides a connection to a display screen for presenting the user interface, the user interface including fields for selection of the initiator for assignment to the volume, wherein the volume is one of plurality of volumes of the storage array.

In another embodiment, computer readable media is provided for obtaining alias assignments of initiators connected to a Fibre Channel (FC) fabric for configuration use on a storage array.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 5A illustrates one example screenshot for adding an initiator to a group, in accordance with one embodiment of the present invention.

FIG. 5B illustrates another example where the user starts to fill in the WWPN, in accordance with one embodiment of the present invention.

FIG. 5C illustrates another example where the user starts to fill in an alias in accordance with one embodiment of the present invention.

FIG. 5D illustrates one example of creating a volume on the storage array, in accordance with one embodiment of the present invention.

FIGS. 5E and 5F illustrate user interfaces in accordance with one embodiment of the present invention.

DETAILED DESCRIPTION

The following embodiments describe methods, devices, systems, and computer programs for storage arrays, which are configured with logic for communicating with a Fibre Channel fabric to obtain previously assigned alias identifiers of initiators. The alias identifiers are then cached at the storage array, so that future selection of initiators can be made using assigned initiator world wide port names (WWPNs) or the retrieved alias identifiers.

During standard array setup, it is generally necessary for storage administrators to access the fabric of switches to identify which initiators have been assigned to a storage array so that volume assignment can be configured. In the switches which compose an FC fabric, zoning configuration controls which initiator ports and array-side target ports are allowed to communicate. This zoning information is useful to the storage administrator, when selecting the set of initiator world wide port names (WWPNs) which may access specific volumes of a storage array. Additionally, the administrator during the zoning process may also assign alias names to WWPNs of initiators. The assigned alias names are used to facilitate easier human understanding of which initiators are mapped, as the WWPN is a hexadecimal number that can be confusing for human administrators to read, remember or retype. Further discussion and examples associated with the alias assignment and auto-complete options for alias usage for initiators is provided with reference to FIGS. 3A-5E below.

One protocol is iSCSI (Internet Small Computer System Interface). iSCSI is used for interconnecting storage arrays to a network, which enables the transport of SCSI commands over Ethernet connections using TCP/IP (i.e., for IP networks). In such configurations, an iSCSI storage implementation can be deployed using Ethernet routers, switches, network adapters, and cabling.

Another protocol is Fibre Channel. Fibre Channel is a high-speed network technology, which is primarily utilized in storage area networks (SANs). Storage arrays are the target devices in a SAN configuration, wherein the fabric and initiators all intercommunicate using the Fibre Channel protocol. Fibre Channel Protocol (FCP) is a transport protocol (similar to TCP used in IP networks) that predominantly transports SCSI commands over Fibre Channel networks.

In accordance with various embodiments described herein, a storage array configurable for Fibre Channel mode or iSCSI mode is provided. The storage array can include logic and hardware to operate in the iSCSI mode and can implement one or more Ethernet cards. To operate in the Fibre Channel mode, the storage array is provided with a Fibre Channel (FC) card (e.g., a hardware card of the controller). The FC card is the link between the Fibre Channel physical network (i.e., PHY) and the Fibre Channel driver (FC) driver of the storage array.

Figure 1A:
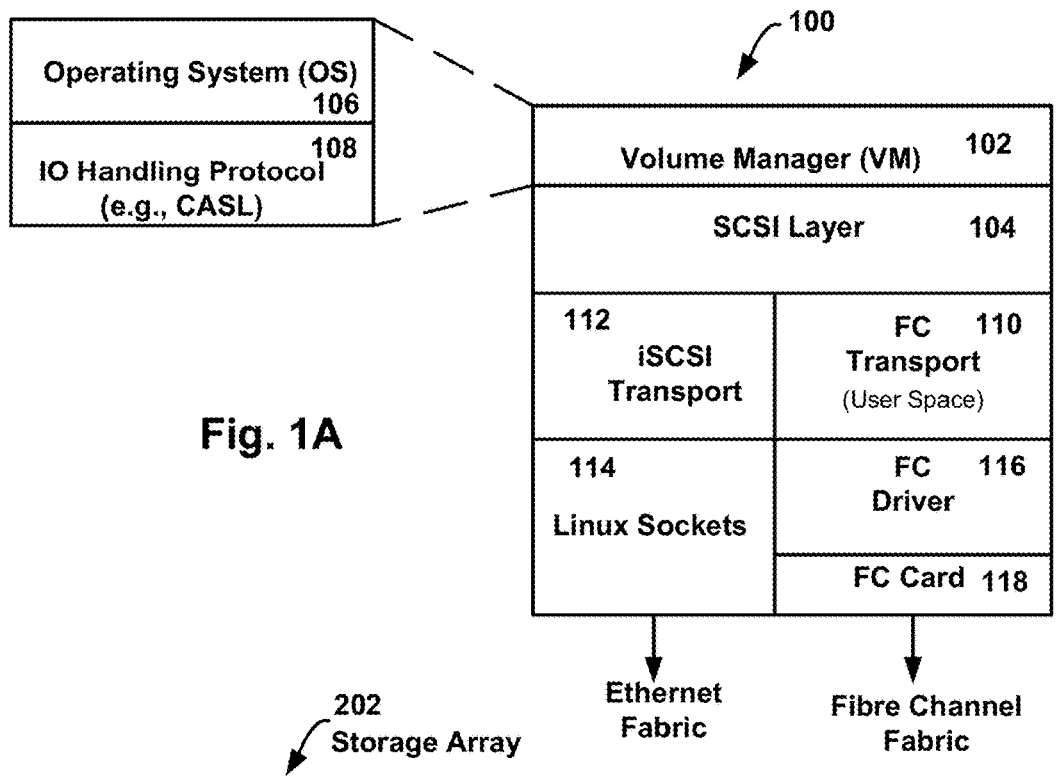
FIG. 1A provides one example view of a storage array SCSI target stack, in accordance with one embodiment.

FIG. 1A provides one example view of a storage array SCSI target stack 100. The stack includes a volume manager (VM) 102, which broadly includes the operating system (OS) 106 of the storage array and an IO handling protocol that processes read and write IO commands to storage of the storage array. The IO handling protocol, in one embodiment, is referred to herein as a cache accelerated sequential layout (CASL) process, which intelligently leverages unique properties of flash and disk of the storage array to provide high performance and optimal use of capacity. CASL functions as the file system of the array, albeit processing is generally performed at the block level instead of file level.

Below the VM 102 is a SCSI layer 104, which is configured to handle SCSI commands. In one embodiment, the SCSI layer 104 has been implemented to be independent of iSCSI transport functionality. For example, in storage arrays configured for pure iSCSI mode operation, the iSCSI transport 112 may include logic that is shared by the SCSI layer 104. However, to implement a Fibre Channel operating storage array, the SCSI layer 104 has been implemented to remove dependencies on the iSCSI transport 112. The SCSI target stack 100 further includes a Fibre Channel (FC) transport 110, which functions as user space for running various processes, which are referred to herein as daemons. The user-space of the FC transport 110 serves as the conduit to the SCSI target (i.e., SCSI layer 104).

A Fibre Channel (FC) driver 116 is further provided, which is in communication with a Fibre Channel (FC) card 118. In one embodiment, in order to interact with the FC card 118, which is a dedicated hardware/firmware, a dedicated FC driver 116 is provided. For each FC card 118 (i.e., supporting one or more ports) in an array, an instance of the FC driver 116 is provided. In one embodiment, a single FC card 118 may be used. The FC card 118 and FC driver 116 may be used to access all FC target ports. In some configurations, however, multiple kernel driver threads may be used to improve performance. In still other configurations, different FC cards 118 from different vendors may be simultaneously supported or used in a single controller. In such a configuration, separate drivers for these device types may be used. The FC driver 116 is, in one embodiment, a kernel level driver that is responsible for interacting directly with the FC card 118 to retrieve incoming SCSI commands, request data transfer, and send SCSI responses, among other things. In one embodiment, the FC card 118 may be an adapter card, which includes hardware, firmware and software for processing Fibre Channel packets between the Fibre Channel fabric and the FC driver. In one specific example, the FC card 118 may be a Fibre Channel Host Bus Adapter (HBA) card, available from Emulex Corporation, located in Costa Mesa, Calif. If the storage array is configured for iSCSI mode, Linux sockets are used to communicate with a TCP/IP network interface card (NIC), for communication with an Ethernet fabric.

Figure 1B:
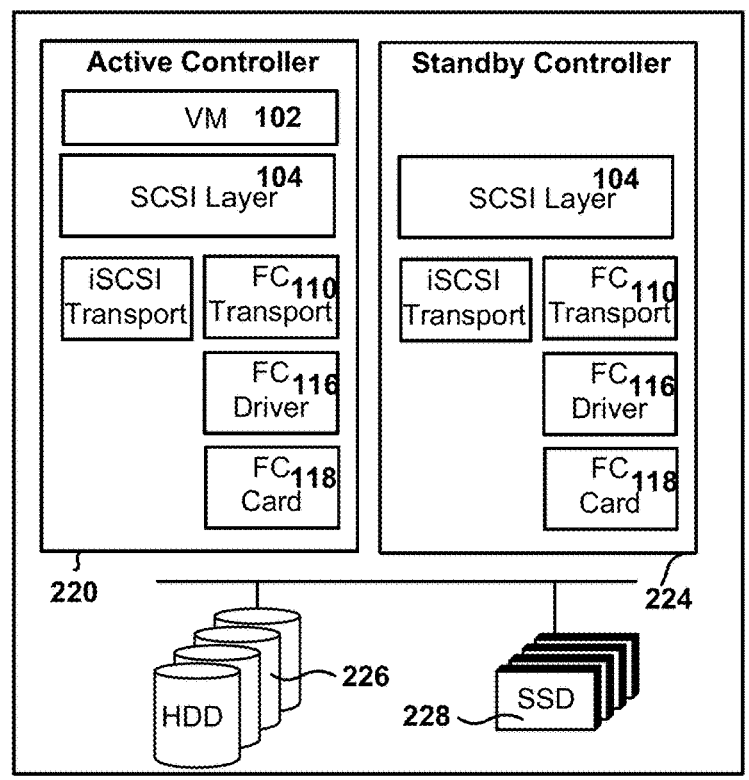
FIG. 1B illustrates an example of a storage array, which includes an active controller, a standby controller, and storage (i.e., hard disk drives (HDDs), and solid state drives (SSDs)), in accordance with one embodiment.

FIG. 1B illustrates an example of a storage array 202, which includes an active controller 220, a standby controller 224, and storage (i.e., hard disk drives (HDDs) 226, and solid state drives (SSDs) 228). This configuration shows the storage array SCSI target stack 100 usable in each of the active and standby controllers 220 and 224, depending on the state of operation. For example, if the active controller 220 is functioning normally, the standby controller is not serving IOs to and from the storage, and ports of the standby controller are simply operational in a standby (SB) state in accordance with an asymmetric logical unit access (ALUA) protocol. The ALUA protocol is described in more detail in a SCSI specification, entitled "Information technology—SCSI Primary Commands—4 (SPC-4)", revision 36s, dated 21 Mar. 2014 (Project T10/BSR INCITS 513), which is incorporated herein by reference. Generally speaking, ALUA is a multi-pathing method that allows each port (e.g., Linux-IO Target) to manage access states and path attributes using assignments that include: (a) active/optimized (AO); (b) active/non-optimized (ANO); (c) standby (SB); unavailable (UA); and (d) logical block dependent (LBD).

In the example of FIG. 1B, it is noted that the standby controller 224 may not have the iSCSI transport 112 during the time it operates as a "standby" controller. If failover occurs and the standby controller 224 becomes the active controller 220, then the iSCSI transport 112 will be populated. Note also, that during Fibre Channel operation, the FC transport 110 is the module that is in operation. Alternatively, if the storage arrays are used in an iSCSI configuration, the iSCSI transport 112 will be needed, along with the Linux Sockets 114 to enable Ethernet fabric communication.

Figure 2:
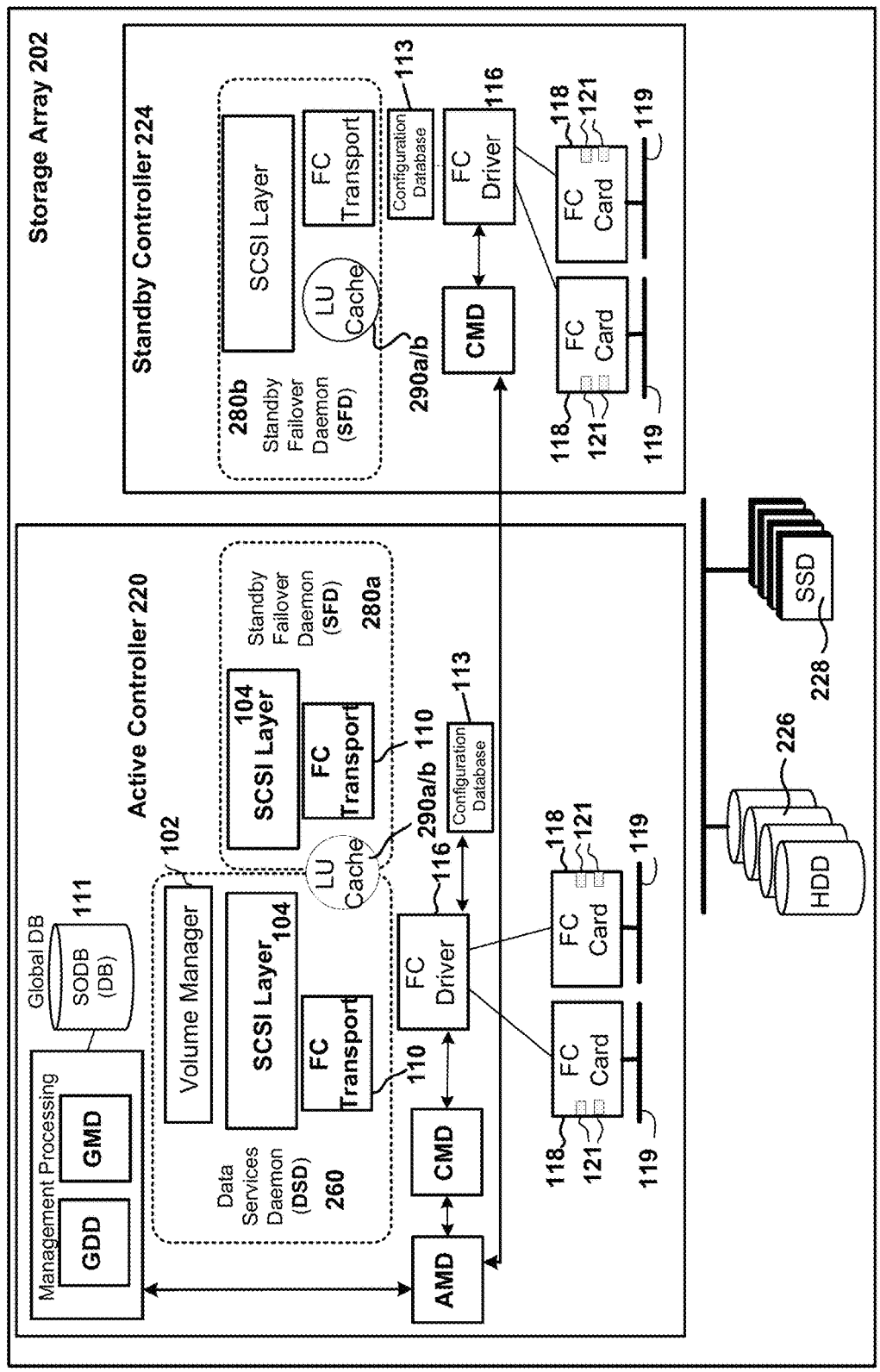
FIG. 2 shows an example of the active controller, which is configured with a data services daemon (DSD), in accordance with one embodiment.

FIG. 2 shows an example of the active controller 220, which is configured with a data services daemon (DSD) 260. DSD 260 is designed to provide full access to the storage array 202 via the VM 102, which includes serving IOs to the volumes of the storage array 202 (e.g., in response to initiator access requests to the SCSI target storage array 202). The DSD 260 of the active controller 220 is a user space process. For failover capabilities within the active controller 220 itself, the user space of the active controller 220 also includes a standby failover daemon (SFD) 280a. The SFD 280a is configured as a backup process that does not process IOs to the volumes of the storage array 202, but can provide limited services, such as responding to information SCSI commands while the DSD 260 is re-started (e.g., after a crash). If the SFD 280a takes over for the DSD 260, the I_T Nexus (i.e., connection) between initiators and the target array remain un-terminated.

The standby controller 224 of the storage array 202 is also configured with an SFD 280b in its user space. As noted above, the ports of the standby controller 224 are set to standby (SB) per ALUA. If a command is received by the SFD of the standby controller, it can process that command in one of three ways. In regard to a first way, for many commands, including READ and WRITE, the SCSI standard does not require the target to support the operation. For this case, SFD 280b returns the SCSI response prescribed by the standard to indicate non-support. In a second way, among the mandatory-to-support SCSI commands, there are certain commands for which initiators expect quick response under all conditions, including during failover.

Examples include, without limitation, INQUIRY, REPORT_LUNS, and REPORT_TARGET_PORT_GROUPS. For these commands, SFD 280b responds locally and independently. In a third way, for other mandatory-to-support SCSI commands (such as PERSISTENT_RESERVATION_IN/OUT), the SFD 280b will depend on the DSD 260 process running on the active controller 220. Thus, a forwarding engine is used to forward SCSI commands from the standby controller 224 to the active controller 220. The active controller 220 will process the commands and sends responses back to the standby controller 224, which will in turn send them to the initiator.

For commands that need to be processed locally, all information required to create an accurate and consistent SCSI response will be stored locally in an LU cache 290a/b. In one embodiment, a logical unit (LU) cache will be present on each of the active and standby controllers 220/224, and consistency methods ensure that all LU cache states are updated. The SFD 280a/b uses the LU cache 290a/b to independently respond to a small number of commands, such as Inquiry, Report LUNs and RTPG.

Furthermore, in Fibre Channel, each FC transport endpoint is identified by a Fibre Channel (FC) World Wide Node Name (WWNN) and World Wide Port Name (WWPN), or generally referred to as World Wide Name (WWN). It is customary and expected that all ports for a given target advertise the same single WWNN. The client OS storage stack will establish a single FC connection to each available FC transport endpoint (WWNN/WWPN pair). In the example of storage array 202, it may have two FC transport endpoints for each of the active controller 220 and the standby controller 224. That is, the active controller 220 may have two ports (i.e., two WWNN/WWPN pairs), and the standby controller 224 may also have two ports (i.e., two WWNN/WWPN pairs). It should be understood that the configuration of the storage array 202 may be modified to include more or fewer ports.

For an FC configuration, because there are multiple LUNs accessible through an SCSI I_T nexus, and there is no free-format "target name" into which lookup information can be embedded, logical unit number (LUN) mapping is maintained for each initiator. The LUN mapping is configured to persistently store the mapping information and maintain consistency across reboots. The LUN mapping is stored in the LU cache 290a/b. The DSD 260 and SFD 280a and 280b are provided with direct access to the LU cache 290a/b. The LU cache 290a/b will also store inquiry data and port state information. In one embodiment, a GDD (Group Data Daemon) and a GMD (Group Management Daemon) will maintain LUN mapping information for each initiator. GDD and GMD are management processing for configuring the storage array 202 and for maintaining settings and configurations during operation. GDD, from SCSI perspective, is configured to work with SCSI layer 104 to handle SCSI Reservation and TMF (task management function). In one embodiment, GDD will support iSCSI login and connection re-balancing for when the storage array 202 is configured/used as an iSCSI target.

A Fibre Channel (FC) card installed in a storage array is manufactured with a World Wide Node Name (WWNN). This configuration works, however, sometimes after the array is configured onto a fabric, there is a need to change the FC card 118. When this happens, the WWNN will change, which requires reconfiguration at the fabric switches. In one configuration shown in FIG. 2, each of the active controller 220 and standby controller 224 have two slots 119 coupled to a bus onto which FC cards 118 connect (i.e., four FC cards 118 per storage array 202). An FC card 118 can have one or more ports 121. In a specific example, each FC card 118 has two ports 121 and each port has a World Wide Port Name (WWPN). In accordance with one embodiment, the WWPN assigned to a slot will be persistent. In other words, if an HBA or even the entire controller is replaced, the WWPNs should not change. To maintain the assignments of WWPNs, a database 111 will be used to store (e.g., configdb 113 for cache access) the WWPNs and their associations with a port id (e.g., port#/controller id/array id). In one embodiment, the WWNN will persist for the lifetime of the group/target. The database 111 will be used to store (configdb 113 for cache access) the WWNNs and their associations with a group/target.

Still referring to FIG. 2, to complete setup, the process will flow to the Group Management Daemon (GMD). If a group of arrays have been configured as a pool, the GMD will query the relevant array to retrieve FC port 121 information. If the storage array 202 is not part of a pool, then GMD will simply query the FC ports 121 of the storage array. In one embodiment, this query is made via a call that is made into the Array Management Daemon (AMD) and then each Controller Management Daemon (CMD) and then into libplatfc. In the present context, "libplatfc" is a library that provides user space processes (e.g., CMD) an API to interact with the FC driver 116. At this point, GMD will generate the WWNN and WWPNs. GMD will persist the WWNs to SODB (i.e., a database 111). GMD will push the WWNs to the ports via AMD and then each CMD. CMD will cache the WWNs in configdb 113. At this point, CMD will notify the FC driver 116 of the WWNs (via libplatfc).

In one embodiment, the assignment of WWNN and WWPN will use the "registered" IEEE Network Address Authority 5 format. For NAA 5 format, there are 9 contiguous nibbles (36 bits) for a vendor-defined value. The NAA 5 format includes 4 bits=0101; 24 bit OUI=6C:9C:E9 (Manufacturer OUI based on an IEEE search); and 36 bit vendor sequence or serial number. Using the NAA 5 format, 36 bits are available, for a maximum of 68,719,476,736 possible unique values.

During standard array setup, it is generally necessary for storage administrators to access the fabric of switches to identify which initiators have been assigned to a storage array so that volume assignment can be configured. In the switches which compose an FC fabric, zoning configuration controls which initiator ports and array-side target ports are allowed to communicate. This zoning information is useful to the storage administrator, when selecting the set of initiator world wide port names (WWPNs) which may access specific volumes of a storage array. Additionally, the administrator during the zoning process may also assign alias names to WWPNs of initiators. The assigned alias names are used to facilitate easier human understanding of which initiators are mapped, as the WWPN is a hexadecimal number that can be confusing for human administrators to read, remember and retype.

In this context, the storage array is the target that holds the volumes, and the storage array has its own world wide node name (WWNN). Within the array, each FC target port has an assigned WWPN. In a typical active/standby array configuration, each array will have four target ports and thus four WWPNs: two for the active controller, and two for the standby controller.

In accordance with one embodiment, the array is provided with a driver process that accesses an API of the switch fabric. The array driver is configured to make a request to the API of the switch fabric that causes the switch fabric to make a copy of its stored mapping of WWPNs and send it back to the array, which in turn stores it to cache of the array. In addition to retrieving the mapping of WWPNs, which are hexadecimal numbers, the request also causes retrieval of the alias names that were associated to the WWPN at the switch by the storage administrator.

Now, during setup of the array, the array administrator is provided with a graphical user interface (GUI) that is populated with a list of WWPNs and associated alias names. The administrator can now easily identify the alias name of the initiator (e.g., accounting, human resources, engineering, etc.) and assign the initiator to one or more volumes of the array. In the GUI, the list of WWPNs is, in one embodiment, provided in a query entry box. As the user fills in the initiator name, the list of possible initiators is reduced to ones that match the currently typed-in words. The query entry box can also receive hexadecimal numbers, so if the user knows the hexadecimal number of a WWPN of an initiator the user may also type-in numbers/letters, which reduces the possible matches of initiators. Thus, the GUI of the array simplifies assignment of WWPNs of initiators to volumes in the array by quickly accessing the cache of WWPNs/aliases obtained from the switch fabric. In one example implementation, display of the cached fabric can be provided aliases, as well as user defined aliases in the GUI list. This feature provides additional usefulness to the storage admins when these two lists are merged into one.

This also avoids a common problem of having to redefine or reassign aliases to WWPNs at the array, which the alias was already provided at the switch. This problem also causes instances where the array administrator may assign a wrong alias to a WWPN, which is easy to do when lists of hexadecimal values look similar.

In one configuration, after the setup is complete, the driver is configured to make API calls to the switch fabric periodically, such as when an initiator logs in to the array. This is useful in case an alias name was changed by the switch administrator during the time when the initiator was logged off. By automatically causing the API call to the switch fabric to retrieve the most current WWPN/alias names upon initiator logins, it is possible to avoid use of outdated alias name assignments and/or mapping to the volumes of the array. Further, this also ensures that when the array administrator looks up the alias names of all initiators accessing volumes of the array, the alias names are indeed correctly referencing the correct initiator.

Figure 3A:
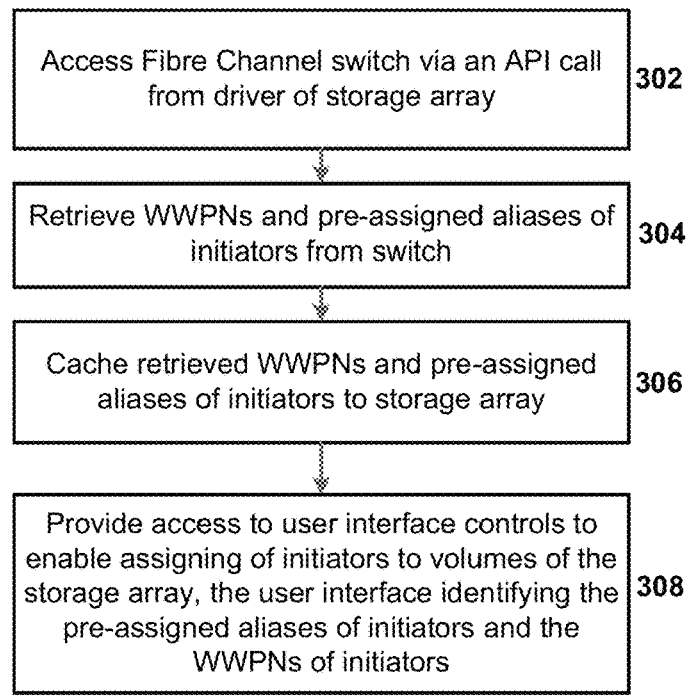
FIG. 3A is a flowchart of a process illustrating operations utilized to access a Fibre Channel fabric to retrieve information regarding initiators (hosts) that may be designed to communicate with a storage array 202, in accordance with one embodiment of the present invention.

FIG. 3A is a flowchart of a process illustrating operations utilized to access a Fibre Channel fabric to retrieve information regarding initiators (hosts) that may be designed to communicate with a storage array 202, in accordance with one embodiment of the present invention. In one embodiment, the information will include the WWPNs as well as preassigned aliases that users have assigned to the initiators via the user interface connected to one or more of the switches of the fabric. In one example process, the storage array 202 is configured with a driver that can access the Fibre Channel switch via an API call, as shown in operation 302. The driver of the storage array 202 is configured to communicate with the API interface of the switch in the fabric, through which one or more initiators will be connected to as part of a fabric.

Generally speaking, a fabric may include one or more switches that provide connection to one or more initiators. A fabric will have one assigned worldwide node name (WWNN), for which each of the switches in the fabric will utilize. The API call from the storage array 202 is made to the switch in the fabric that the storage array 202 is connected to, based on the wiring configuration. Other switches in the fabric will therefore be interconnected and will have access to the storage array 202 if made accessible via access control logic.

As will be described below, initiators are configured, once given access to a storage array 202, to log into the storage array 202 for receiving services of the storage array 202 (e.g., storage services). In operation 304, the WWPNs and associated preassigned aliases of initiators configured to communicate with the storage array 202 are obtained and retrieved from the switch. In operation 306, the retrieved WWPNs and associated preassigned aliases for initiators that will communicate with the storage array 202 will be saved to cache of the storage array 202. In one embodiment, a database 111 of the storage array 202 will act to store the retrieved WWPNs and associated preassigned aliases, and saving to the database 111 will act as a caching operation.

Now that the storage array 202 has the retrieved WWPNs and any preassigned aliases for the corresponding WWPNs of initiators, other functions such as assigning initiators to specific volumes of the storage array 202 can be performed in operation 308. A user interface of the storage array 202 can be used to facilitate the associating of initiators to specific volumes of the storage array 202. As will be described further below, users can simply select initiators from a list of initiators by reading the alias names as opposed to trying to identify the hexadecimal notation of the WWPNs assigned to the initiators.

Figure 3B:
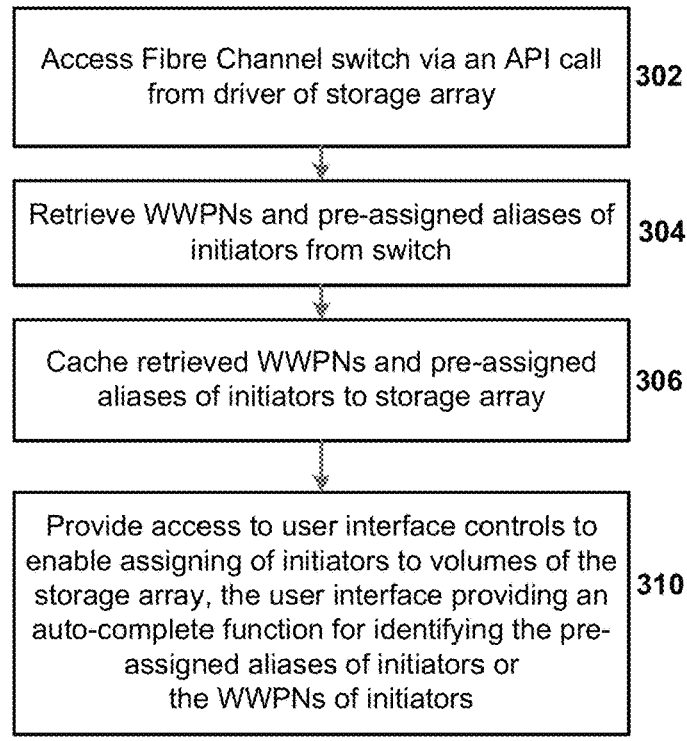
FIG. 3B illustrates another embodiment for accessing a switch of a Fibre Channel fabric to retrieve WWPNs and preassigned aliases of the initiators, in accordance with one embodiment of the present invention.

FIG. 3B illustrates another embodiment for accessing a switch of a Fibre Channel fabric to retrieve WWPNs and preassigned aliases of the initiators. In this example, operations 302, 304, and 306 may be performed substantially similar to FIG. 3A. In operation 310, the user interface can provide various functionalities to simplify the selection of initiators to associate to particular volumes of the storage array 202. In one embodiment, a functionality of an auto complete function is provided so that users can type in an alias and options for specific aliases are populated in a drop-down menu. For instance, as the user attempts to type in the name of an alias, the system will start to populate options of different aliases that are available. Once the alias is selected, the corresponding WWPN is matched or correlated or mapped to the alias. This functionality is provided because the storage array 202 has retrieved the corresponding WWPN and assigned aliases and cached them for local use when assigning or selecting initiators for association to specific volumes of a storage array 202.

Figure 3C:
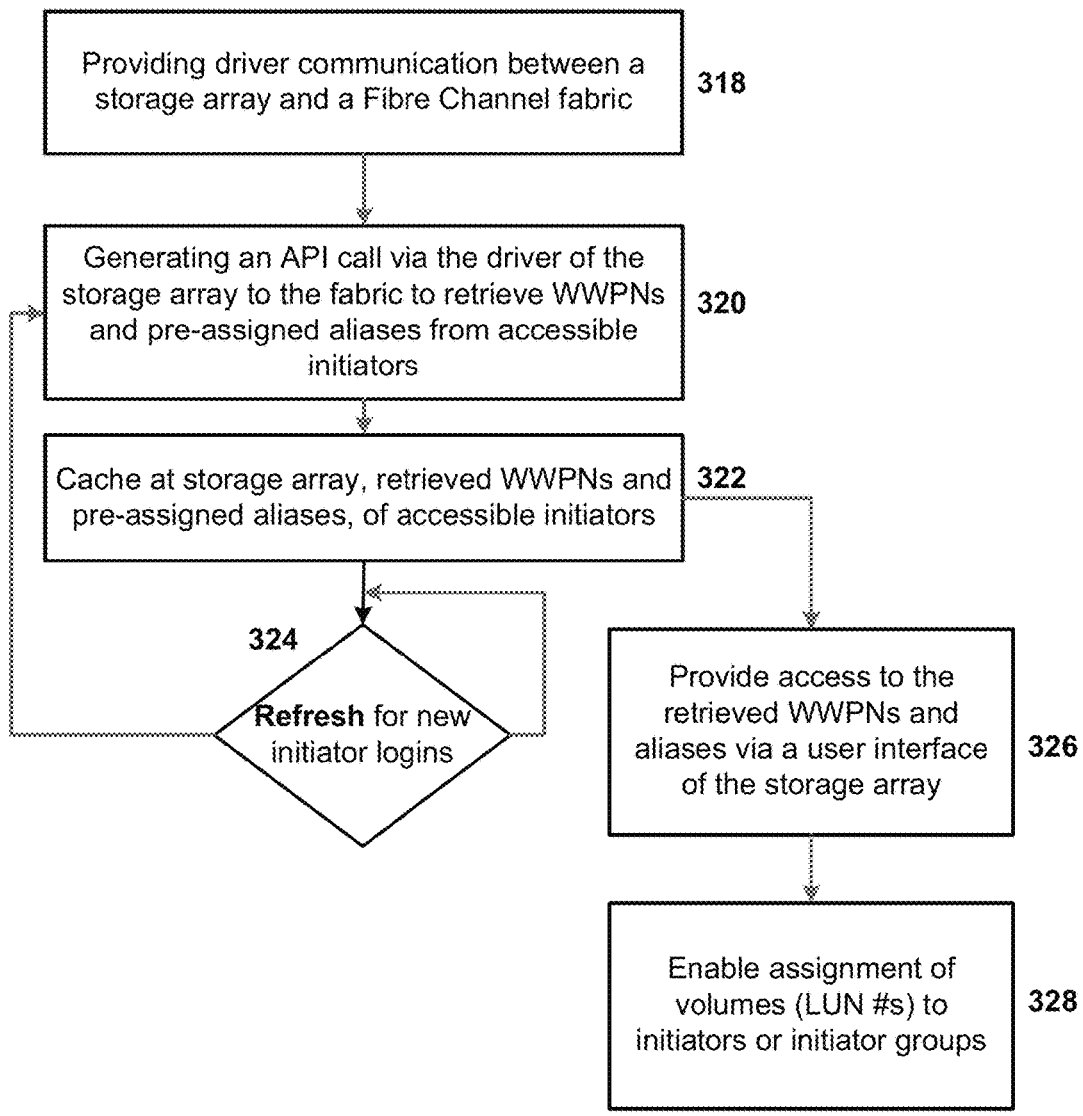
FIG. 3C illustrates an example of a flow diagram showing operations for continuing to refresh the mappings of WWPNs/aliases for initiators that can be associated to and granted access for specific volumes of a storage array in accordance with one embodiment of the present invention.

FIG. 3C illustrates an example of a flow diagram showing operations for continuing to refresh the mappings of WWPNs/aliases for initiators that can be associated to and granted access for specific volumes of a storage array 202. In this example, operation 318 includes providing a driver that communicates between the storage array 202 and a Fibre Channel fabric. In one embodiment, the communication is by way of a switch of the fabric to which the storage array 202 is connected. In operation 320, an API call is generated via the driver of the storage array 202. The API call is to the fabric so as to retrieve the WWPNs and preassigned aliases from accessible initiators. In operation 322, a response from the fabric will be to provide the WWPNs and the preassigned aliases stored locally on the fabric. In one embodiment, one or more of the switches of the fabric will store the associations of the WWPN and aliases, if aliases have been preassigned to the WWPNs via the fabric. If a particular initiator has not been assigned an alias, the alias will not be present at the fabric. However, if the alias is assigned, the next time the API gets the mapped WWPNs and aliases, that information will be stored to cache in the storage array 202.

In operation 324, a decision is made as to whether to refresh for new initiators that are attempting logins to the storage array 202. For instance, if a storage array was not operational or connected when a previous API call was made to retrieve the mappings, the mappings would not be present in cache. For this reason, operation 324 may be made periodically, on a timer, or instantly when initiator attempts a login to the storage array 202. Operation 326 is provided to allow access to a user interface to retrieve the WWPN and aliases. The user interface can take on many forms, such as pulldown menus, selection icons, buttons, switches, drag-and-drop functions, gesture inputs, and the like. In operation 328, utilizing the mappings of the WWPN's and aliases, user interfaces can be provided to enable users to assign specific initiators or initiator groups to specific volumes having assigned LU#s (logical unit numbers).

Figure 4A:
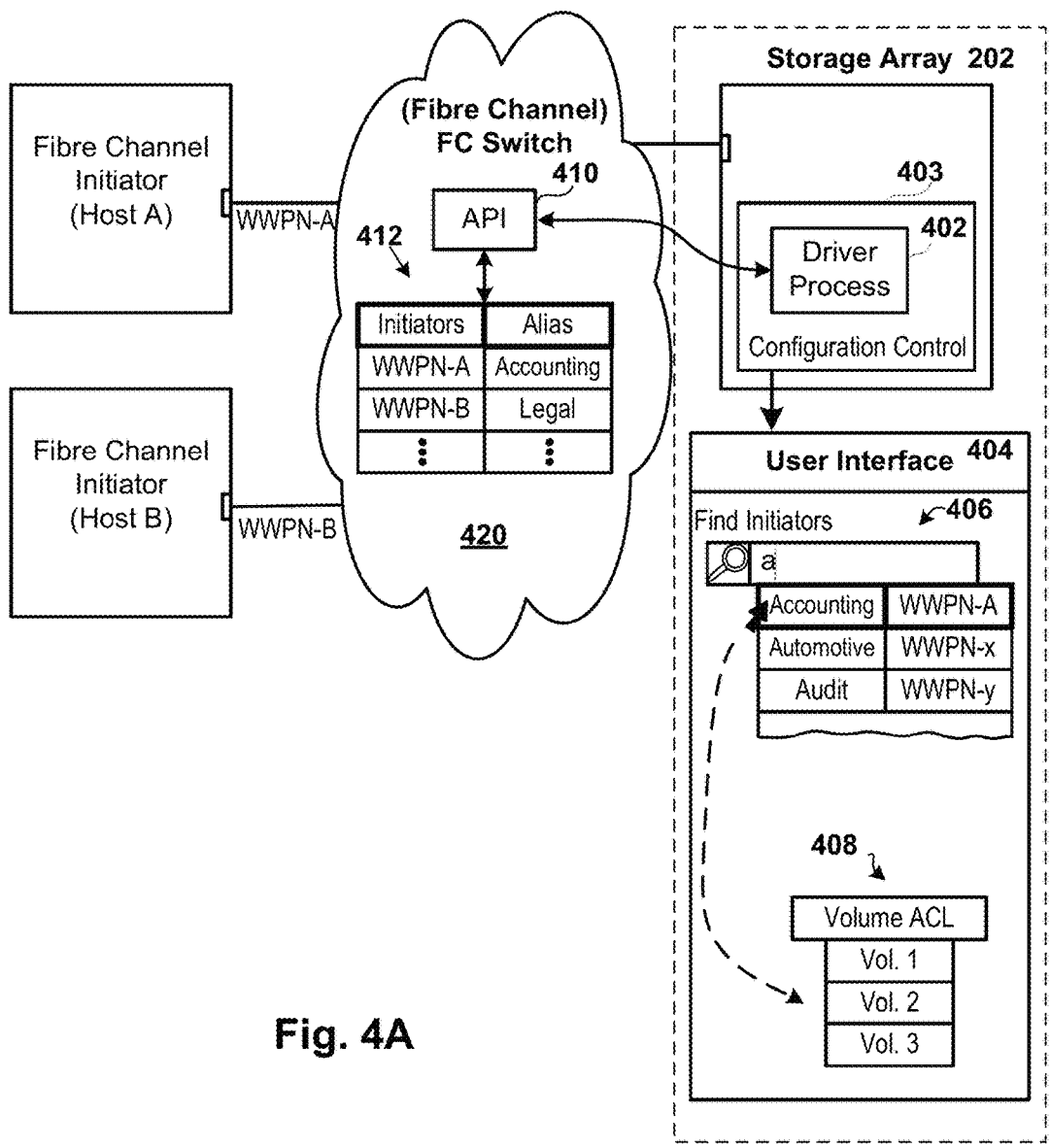
FIG. 4A illustrates an example of a FC (Fibre Channel) switch which is part of a fabric, in accordance with one embodiment of the present invention.

FIG. 4A illustrates an example of a FC (Fibre Channel) switch 420 which is part of a fabric. The fabric, as mentioned above, can have one or more switches that provide interconnection to one or more initiators to the storage array 202. In this example, Fibre Channel initiators (HOST A and HOST B) are shown connected to the FC switch 420. Each of the initiator hosts will have their own WWPN, and in this example, aliases have been assigned (accounting, legal). The FC switch 420 will include an API 410 that can enable access to storage that holds information regarding the initiators and any assigned aliases. This information 412 can be added directly at a switch through user interface or through some other interconnected/networked computing device.

In one embodiment, the storage array 202 will have a configuration control 403 that enables access or logic control to the driver 402 and communication or interfacing logic with a user interface 404. As noted above, a user interface 404 can include various icons, pull downs, selection controls, and other graphical user or keyboard entry fields. One way to find an initiator is through an auto complete find window 406, which allows the user to start typing in the name of an alias. In this example, the user has typed in the letter "a" and various aliases appear below in a drop-down. In one embodiment, the corresponding WWPN characters (i.e., WWPNs are hexadecimal character sets, but simplified for this example). In another embodiment, only the aliases appear in the drop-down and once the alias is selected the corresponding WWPN characters will appear or be shown as a pair.

For illustration purposes, assuming that the user has selected "accounting" as the alias, the user can now associate or assign that particular initiator to a specific volume. Assigning an initiator to a volume can include use of volume access control lists (ACLs) 408 which manage accessibility to volumes from the various initiators (e.g. via granted privileges). This illustration is a high level example simply to show that once an initiator has been selected using the simple alias notation, which was retrieved automatically by the storage array 202, an initiator can be assigned to a volume of the storage array 202. As mentioned above, it is also possible to assign a group of initiators to specific volumes.

Figure 4B:
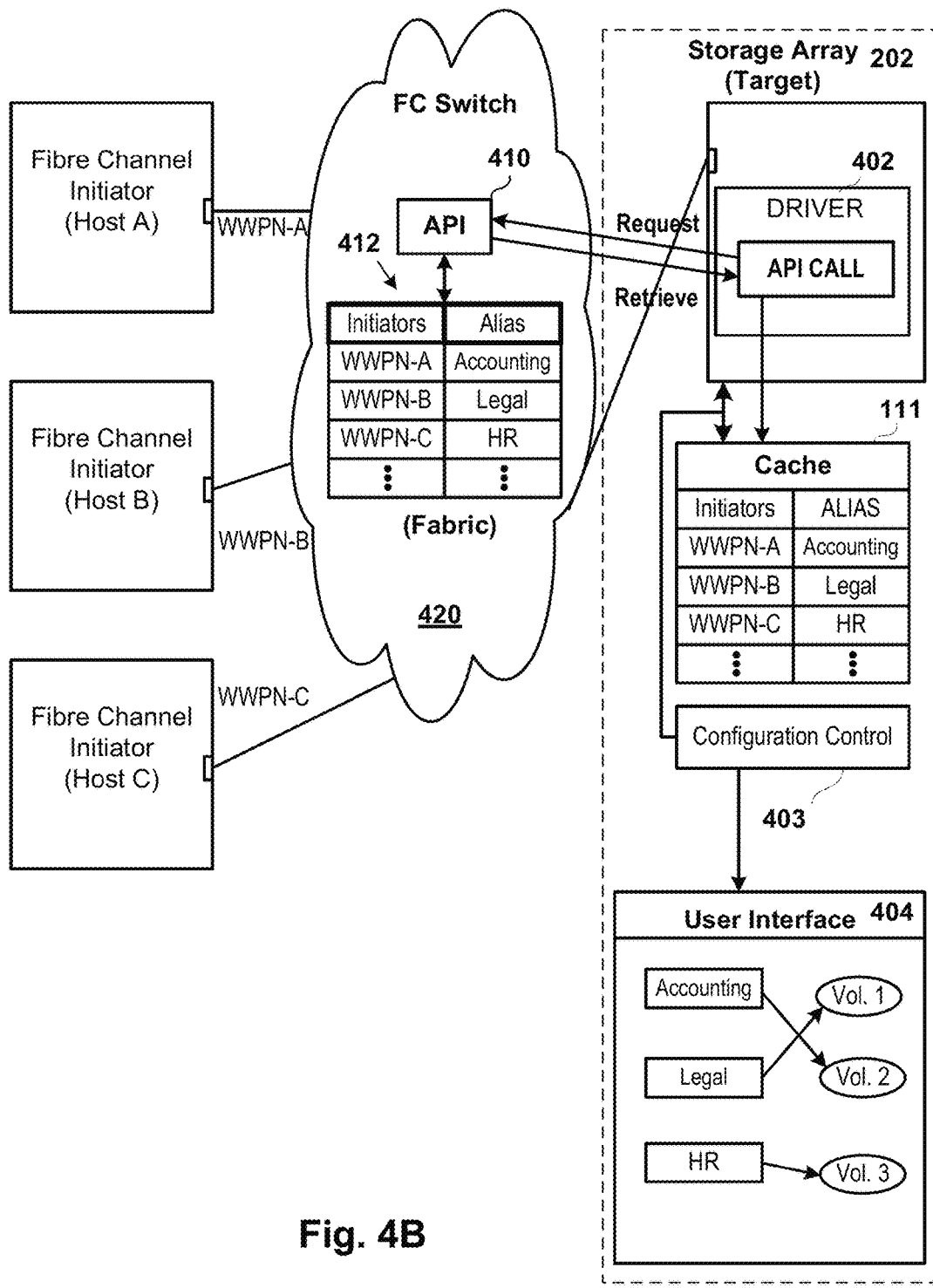
FIG. 4B illustrates an example where three hosts (HOST A, B, and C) are connected to the FC switch, which defined the fabric to which the storage array is connected, in accordance with one embodiment of the present invention.

FIG. 4B illustrates an example where three hosts (HOST A, B, and C) are connected to the FC switch 420, which defined the fabric to which the storage array 202 is connected. It should be understood that the storage array 202 can connect to multiple fabrics, and this example of a single fabric is only by way of illustration to show the retrieval of alias information assigned to WWPN's at the FC fabric 420. In this example, the driver 402 of the storage array 202 can make an API call to the API 410 of the FC switch 420. The call will be a request to the API 410 to retrieve the WWPN's and associated aliases for available initiators connected thereto. In response, the API 410 of the FC switch 420 will retrieve the mapping information of WWPN's and aliases 412 to the storage array 202, whereby the driver will cause the mapping information to be cached in a database 111. Once this information has been cached, it is available to the storage array 202 for quick identification of aliases that have been assigned to specific initiators at the FC switch. The user interface 404 can now be used to communicate with configuration control 403 so that a user can associate specific initiators to specific volumes of the storage array 202.

Figures 5A, 5B, 5C:
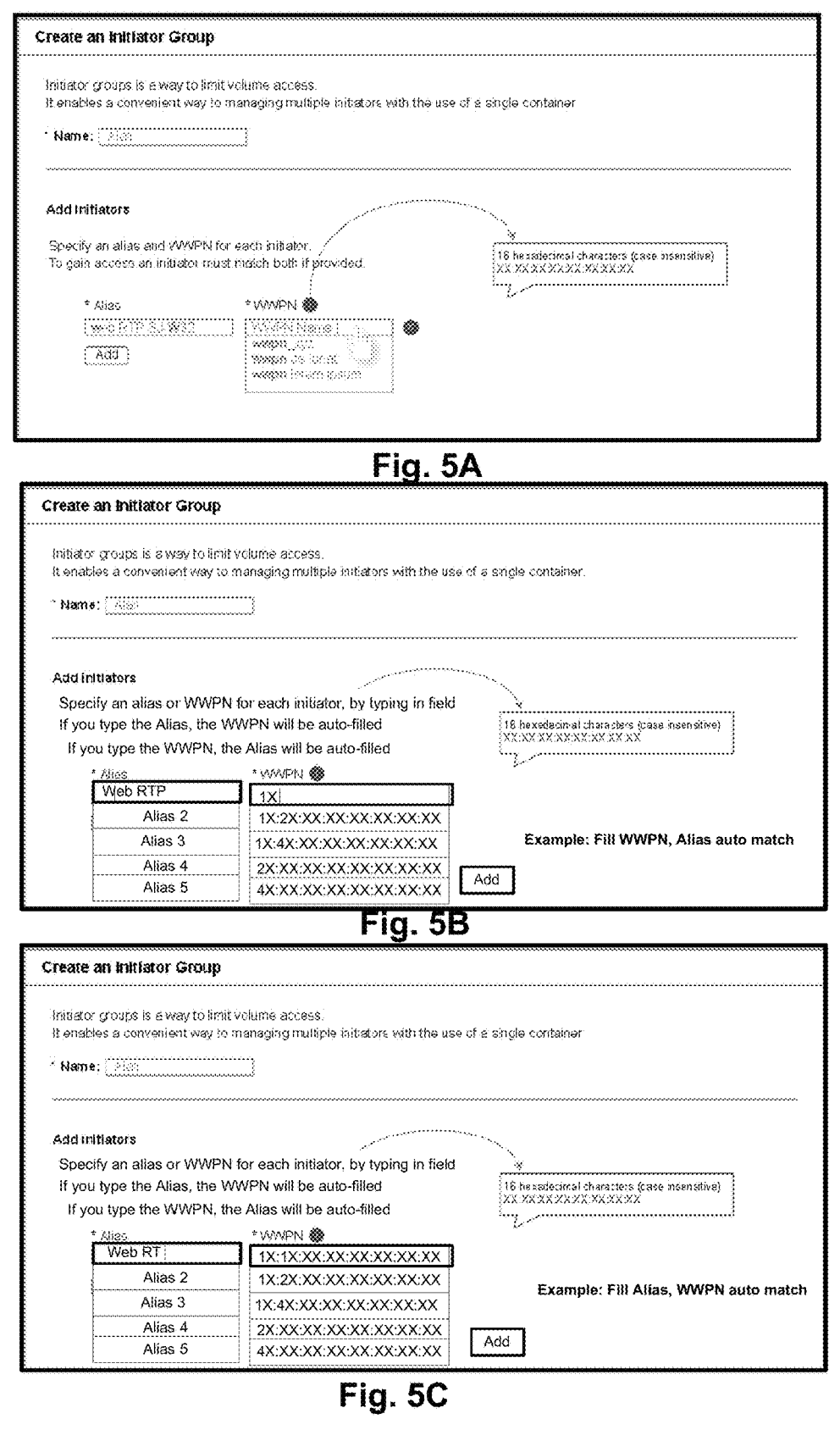

FIG. 5A illustrates one example screenshot for adding an initiator to a group. In this example, the initiator group is a way to limit volume access. Thus, this provides a way to manage multiple initiators with the use of a single container. A group can be custom named, and in this example, the group is named "Alan."

In one configuration, the user is asked to specify an alias and WWPN for each initiator that is added to the group. The user can type in the alias name using any easy human understandable form, e.g., words, text, numbers and combinations thereof. The WWPN, which is a 16 hexadecimal string of characters, is not a human understandable form, although some humans that can recall long strings of characters may understand or recall the WWPN. In this particular example, the user types in "WWPN Name" to illustrate the 16 hexadecimal characters.

This process, in one embodiment, allows a user to force a new alias in the user interface box, which may be different than the alias retrieved from the fabric (e.g., switch(s)). If the alias is provided for a WWPN in FIG. 5A, that alias provided is forced to be the alias for the initiator as seen by the storage array 202. This will be true, even if the fabric has a different alias. In another embodiment, the user may choose to leave the "Alias" field empty. If one is entered, the alias can in one example be a maximum of 32 characters. For example only, a valid character set is: [AZ] [az] [09] [:] [ ] [.] (not starting with ":", " ", "."). Other character sets or combinations may be used. In one embodiment, the "WWPN" field is required, and the existence of the value of this field will be validated prior to issuing an API call to create the initiator group and add an initiator to it. For this embodiment, a warning message: "WWPN value cannot be empty" may be presented. Another warning message may be: "The following values conflict: "Alias A already points to WWPN1." Do you want to replace the corresponding values?" As noted above, if the answer is yes, the new alias will only be for the storage array 202, even though the fabric has a different alias.

FIG. 5B illustrates another example where the user starts to fill in the WWPN. In one configuration, the cached mapping of the WWPN to alias is used to populate a drop down of options. As more characters are typed, the options in the drop down refine further. This provides for an easy way to confirm that the WWPN being typed corresponds to the alias of the initiator being added to the group. The WWPN/alias selected can then be associated to volumes, wherein one or more volumes can be associated to the initiator group. In other configurations, a group may include a single initiator, and that single initiator may be assigned to or corresponded to one volume or multiple volumes. In other examples, a drop down is only provided for the box in the user interface that is being provided with characters (i.e., in this case the WWPN box). Under the alias side, no drop down would be provided and only the alias for the selected WWPN is automatically populated, since the data was retrieved from the fabric in advance, and saved to cache (e.g., database 111). Thus, each unique WWPN shall have one and only one alias.

FIG. 5C illustrates another example where the user starts to fill in an alias. In one configuration, the cached mapping of the alias to WWPN to alias is used to populate a drop down of options. As more characters are typed, the options in the drop down refine further. This provides another easy way to confirm that the alias being typed corresponds to the WWPN of the initiator being added to the group. The alias/WWPN selected can then be associated to volumes, wherein one or more volumes can be associated to the initiator group. As noted, some configurations can have a group include a single initiator, and that single initiator may be assigned to or corresponded to one volume or multiple volumes. In other examples, a drop down is only provided for the box in the user interface that is being provided with characters (i.e., in this case the Alias box). Under the WWPN side, no drop down would be provided and only the WWPN for the selected alias is automatically populated, since the data was retrieved from the fabric in advance. Thus, each unique alias shall resolve to a single WWPN.

Figures 5D, 5E, 5F:
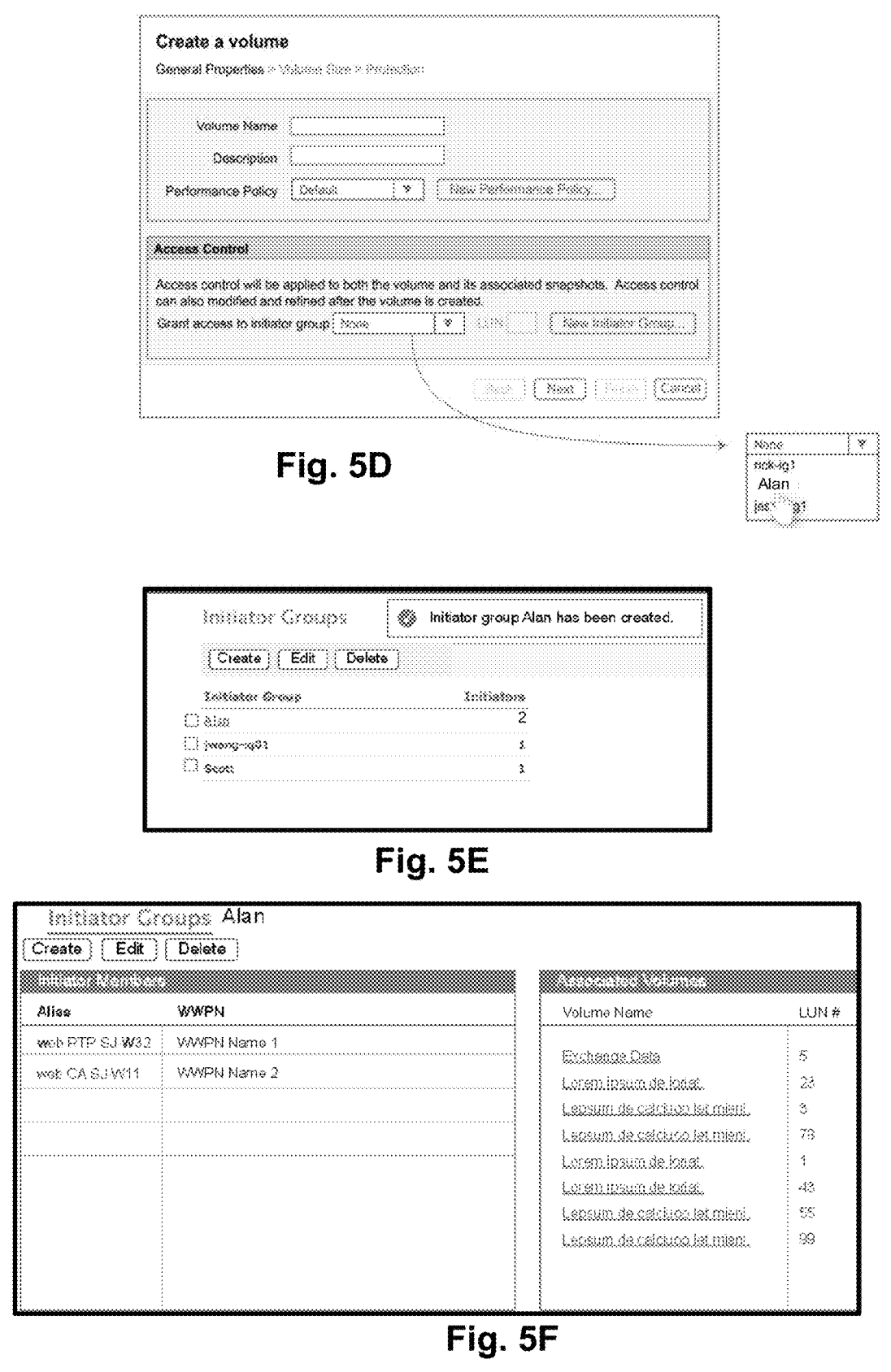

FIG. 5D illustrates one example of creating a volume on the storage array 202. The user may provide a name, a description and a performance policy. Access control is also provided, such that certain ones of the groups can be granted access to a volume. In this example, a volume may be granting initiators of group "Alan" with access. The associated snapshots of the volumes are also provided access.

FIG. 5E illustrates a user interface showing that group "Alan" has two (2) initiators associated therewith, and FIG. 5F illustrates the two initiator members. The two initiator members also shown with their associated volumes (and showing the LUN #'s of each volume). FIG. 5F will show, in one configuration, both the alias and the WWPN pairs, as they were obtained from cache. As noted above, once the alias and WWPN pairs are obtained from the fabric, this data is stored to cache, which in one configuration is database 111 shown in FIG. 2.

Example Storage Array Infrastructure

Figure 6:
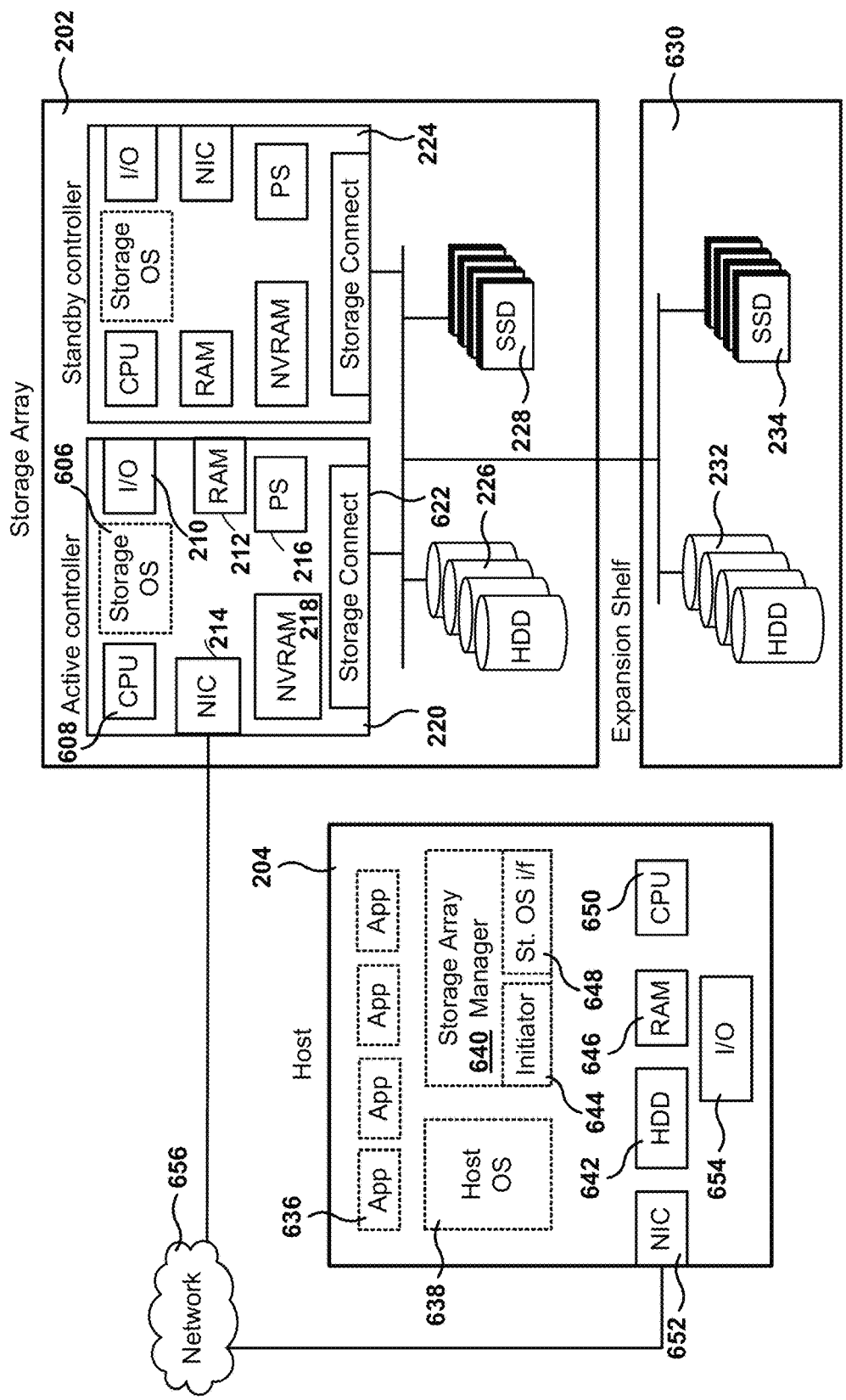
FIG. 6 illustrates an example architecture of a storage array 102, according to one embodiment.

FIG. 6 illustrates an example architecture of a storage array 102, according to one embodiment. In one embodiment, storage array 102 includes an active controller 220, a standby controller 224, one or more HDDs 226, and one or more SSDs 228. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 226, or to SSD 228, or to both.

In addition, the active controller 220 further includes CPU 608, general-purpose RAM 212 (e.g., used by the programs executing in CPU 608), input/output module 210 for communicating with external devices (e.g., USB port, terminal port, connectors, plugs, links, etc.), one or more network interface cards (NICs) 214 for exchanging data packages through network 656, one or more power supplies 216, a temperature sensor (not shown), and a storage connect module 622 for sending and receiving data to and from the HDD 226 and SSD 228. In one embodiment, the NICs 214 may be configured for Ethernet communication or Fibre Channel communication, depending on the hardware card used and the storage fabric. In other embodiments, the storage array 202 may be configured to operate using the iSCSI transport or the Fibre Channel transport.

Active controller 220 is configured to execute one or more computer programs stored in RAM 212. One of the computer programs is the storage operating system (OS) used to perform operating system functions for the active controller device. In some implementations, one or more expansion shelves 630 may be coupled to storage array 202 to increase HDD 232 capacity, or SSD 234 capacity, or both.

Active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., IO requests) are sent over network 656, and the storage array 202 stores the sent data or sends back the requested data to host 204.

Host 204 is a computing device including a CPU 650, memory (RAM) 646, permanent storage (HDD) 242, a NIC card 652, and an IO module 654. The host 204 includes one or more applications 636 executing on CPU 650, a host operating system 638, and a computer program storage array manager 640 that provides an interface for accessing storage array 202 to applications 636. Storage array manager 640 includes an initiator 644 and a storage OS interface program 648. When an IO operation is requested by one of the applications 636, the initiator 644 establishes a connection with storage array 202 in one of the supported formats (e.g., iSCSI, Fibre Channel, or any other protocol). The storage OS interface 648 provides console capabilities for managing the storage array 202 by communicating with the active controller 220 and the storage OS 606 executing therein. It should be understood, however, that specific implementations may utilize different modules, different protocols, different number of controllers, etc., while still being configured to execute or process operations taught and disclosed herein.

In some embodiments, a plurality of storage arrays may be used in data center configurations or non-data center configurations. A data center may include a plurality of servers, a plurality of storage arrays, and combinations of servers and other storage. It should be understood that the exact configuration of the types of servers and storage arrays incorporated into specific implementations, enterprises, data centers, small office environments, business environments, and personal environments, will vary depending on the performance and storage needs of the configuration.

In some embodiments, servers may be virtualized utilizing virtualization techniques, such that operating systems can be mounted on hypervisors to allow hardware and other resources to be shared by specific applications. In virtualized environments, storage is also accessed by virtual hosts that provide services to the various applications and provide data and store data to storage. In such configurations, the storage arrays can be configured to service specific types of applications, and the storage functions can be optimized for the type of data being serviced.

For example, a variety of cloud-based applications are configured to service specific types of information. Some information requires that storage access times are sufficiently fast to service mission-critical processing, while other types of applications are designed for longer-term storage, archiving, and more infrequent accesses. As such, a storage array can be configured and programmed for optimization that allows servicing of various types of applications. In some embodiments, certain applications are assigned to respective volumes in a storage array. Each volume can then be optimized for the type of data that it will service.

As described with reference to FIG. 6, the storage array 202 can include one or more controllers 220, 224. One controller serves as the active controller 220, while the other controller 224 functions as a backup controller (standby). For redundancy, if the active controller 220 were to fail, immediate transparent handoff of processing (i.e., fail-over) can be made to the standby controller 224. Each controller is therefore configured to access storage, which in one embodiment includes hard disk drives (HDD) 226 and solid-state drives (SSD) 228. As mentioned above, SSDs 228 are utilized as a type of flash cache, which enables efficient reading of data stored to the storage.

As used herein, SSDs functioning as "flash cache," should be understood to operate the SSD as a cache for block level data access, providing service to read operations instead of only reading from HDDs 226. Thus, if data is present in SSDs 228, reading will occur from the SSDs instead of requiring a read to the HDDs 226, which is a slower operation. As mentioned above, the storage operating system 606 is configured with an algorithm that allows for intelligent writing of certain data to the SSDs 228 (e.g., cache-worthy data), and all data is written directly to the HDDs 226 from NVRAM 218.

The algorithm, in one embodiment, is configured to select cache-worthy data for writing to the SSDs 228, in a manner that provides an increased likelihood that a read operation will access data from SSDs 228. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 228 may be referred to as flash, or flash cache, or flash-based memory cache, or flash drives, storage flash, or simply cache. Consistent with the use of these terms, in the context of storage array 102, the various implementations of SSD 228 provide block level caching to storage, as opposed to instruction level caching. As mentioned above, one functionality enabled by algorithms of the storage OS 606 is to provide storage of cache-worthy block level data to the SSDs, so that subsequent read operations are optimized (i.e., reads that are likely to hit the flash cache will be stored to SSDs 228, as a form of storage caching, to accelerate the performance of the storage array 102).

In one embodiment, it should be understood that the "block level processing" of SSDs 228 serving as storage cache, is different than "instruction level processing," which is a common function in microprocessor environments. In one example, microprocessor environments utilize main memory, and various levels of cache memory (e.g., L1, L2, etc). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 228 is implemented by algorithms exercised by the storage OS 606, which can differentiate between the types of blocks being processed for each type of application or applications. That is, block data being written to storage 1130 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 606, for efficient use of flash cache 228.

Continuing with the example of FIG. 6, that active controller 220 is shown including various components that enable efficient processing of storage block reads and writes. As mentioned above, the controller may include an input output (TO) 210, which can enable one or more machines to access functionality of the storage array 202. This access can provide direct access to the storage array, instead of accessing the storage array over a network. Direct access to the storage array is, in some embodiments, utilized to run diagnostics, implement settings, implement storage updates, change software configurations, and/or combinations thereof. As shown, the CPU 608 is communicating with storage OS 606.

It should be apparent, that the present embodiments may be practiced without some or all of these specific details. Modification to the modules, code and communication interfaces are also possible, so long as the defined functionality for the storage array or modules of the storage array is maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

The invention claimed is:

1. A method for obtaining alias assignments of initiators connected to a Fibre Channel (FC) fabric for configuration use on a storage array, comprising:

generating a request from the storage array to a switch of the FC fabric to which the storage array is connected, the request being to obtain a copy of a world wide port name (WWPN) of a given initiator, of the initiators, that is connected to the FC fabric and a copy of an alias name for the given initiator;

receiving the WWPN and alias name of the given initiator from the switch;

caching the received WWPN and alias name to a database of the storage array; and a user interface of the storage array to receive selection of respective ones of the initiators for assignment to respective volumes of the storage array, the user interface including a selection control that identifies the given initiator using the alias name received from the switch.

2. The method of claim 1, wherein the user interface further includes a data field that identifies the WWPN for the given initiator that is mapped to the alias name.

3. The method of claim 1, wherein the request is processed automatically by the storage array to maintain a list of alias names current for the given initiator and other ones of the initiators connected to the FC fabric.

4. The method of claim 1, wherein the request is processed automatically at periodic intervals.

5. The method of claim 1, further comprising, each time the storage array detects a login attempt by at least one other initiator retrieving WWPNs and alias names from the switch.

6. The method of claim 1, wherein the request is an application programming interface (API) call triggered by a driver process of the storage array.

7. The method of claim 1, wherein the WWPN is a hexadecimal number and the alias name is a descriptive identifier of the given initiator.

8. The method of claim 1, wherein the database of the storage array holds configuration data for the storage array, the configuration data includes the WWPN and alias name received from the switch, and further comprising, refreshing the configuration data of the storage array by receiving one or more WWPNs and alias names for one or more of the initiators or updates to the alias name of the given initiator.

9. The method of claim 1, wherein the user interface includes an auto-fill function that provides options of alias names for selection, wherein each of the options of alias names provided are alias names received from the switch in response to the request and cached in the database of the storage array.

10. The method of claim 1, wherein the given initiator is associated to a group of initiators, and the group of initiators is associated to a volume using an access control interface of the user interface of the storage array.

11. The method of claim 10, wherein each initiator in the group of initiators is presented on a screen of the user interface with corresponding WWPNs and alias names, wherein the corresponding WWPs and alias names are gathered automatically from the FC fabric via a process of the storage array.

12. The method of claim 1, wherein the alias name for the given initiator was created via the switch of the FC fabric.

13. A method for obtaining alias assignments of initiators connected to a Fibre Channel (FC) fabric, comprising:

processing a request from a storage array to a switch of the FC fabric, the request including instruction to the switch to copy world wide port names (WWPNs) of the initiators connected to the FC fabric and assigned aliases for the initiators;

retrieving the WWPNs and aliases of the initiators from the switch;

caching the retrieved WWPNs and aliases at the storage array; and a user interface of the storage array to receive selection of respective ones of the initiators to be assigned access to respective volumes of the storage array, the user interface providing a selection control that includes at least some of the retrieved aliases so that selection of a given initiator is by way of selection of an alias for the given initiator via the user interface, each of the retrieved aliases for the initiators being associated with WWPNs.

14. The method of claim 13, wherein the request is processed automatically by a driver process of the storage array to maintain a list of aliases current for the initiators connected to the FC fabric.

15. The method of claim 14, wherein the request is an application programming interface (API) call triggered by the driver process.

16. The method of claim 13, wherein the caching is to a database of the storage array that holds configuration data for the storage array, the configuration data includes the retrieved WWPNs and aliases, and further comprising, refreshing the configuration data of the storage array by receiving one or more WWPNs and aliases for one or more of the initiators or updates to the aliases of the initiators.

17. The method of claim 13, wherein assigning access to a volume includes presenting available volumes from an access control list of the user interface of the storage array.

18. The method of claim 13, wherein the request is processed each time the storage array detects a login attempt by at least one other initiator or periodically at a predefined interval to maintain a list of aliases current for the initiators connected to the FC fabric.

19. A storage array for providing storage to initiators of via a Fibre Channel (FC) fabric, the storage array including:

a controller for processing access to volumes of a storage array;

database storage for holding configuration data of the storage array, a processor of the controller configured to generate a request from the storage array to a switch of the FC fabric to which the storage array is connected, the request being to obtain a copy of world wide port names (WWPNs) of initiators that are connected to the FC fabric and a copy of alias names for the initiators, the processor configured to cache received WWPNs and alias name to the database storage of the storage array, the processor to provide a user interface to receive selection of respective ones of the initiators for assignment to respective ones of the volumes of the storage array, the user interface including a selection control that identifies a given initiator, of the initiators, using the alias name received from the switch of the FC fabric.

20. The storage array of claim 19, wherein the user interface further includes a data field that identifies the WWPN for the given initiator that is mapped to the alias name, wherein the request is processed automatically to maintain current the alias names for the initiators connected to the FC fabric.

21. The storage array of claim 19, wherein the request is an application programming interface (API) call triggered by a driver process executed by the processor of the storage array.

22. The storage array of claim 19, wherein the storage array provides a connection to a display screen for presenting the user interface, the user interface including fields for selection of the respective initiators for assignment to the respective volumes of the storage array.

23. A non-transitory computer readable storage medium having program instructions for obtaining alias assignments of initiators connected to a Fibre Channel (FC) fabric for configuration use on a storage array, the computer readable media comprising:

program instructions to generate a request from the storage array to a switch of the FC fabric to which the storage array is connected, the request being to obtain a copy of a world wide port name (WWPN) of a given initiator, of the initiators, that is connected to the FC fabric and a copy of an alias name for the given initiator;

program instructions to receive the WWPN and alias name of the given initiator from the switch;

program instructions to cache the received WWPN and alias name to a database of the storage array; and program instructions to provide a user interface of the storage array to receive selection of respective ones of the initiators for assignment to respective volumes of the storage array, the user interface includes a selection control that identifies the given initiator using the alias name received from the switch.

24. The non-transitory computer readable storage medium of claim 23, wherein the user interface further includes a data field that identifies the WWPN for the given initiator that is mapped to the alias name, and the program instructions are configured to trigger the request automatically to maintain a list of alias names current for the given initiator and other ones of the initiators connected to the FC fabric.

25. The non-transitory computer readable storage medium of claim 23, further comprising, each time the storage array detects a login attempt by at least one other initiator, retrieving WWPNs and alias names from the switch.

26. The non-transitory computer readable storage medium of claim 23, wherein the request is an application programming interface (API) call triggered by a driver process of the storage array, and the WWPN is a hexadecimal number and the alias name is a descriptive identifier of the given initiator.

27. The non-transitory computer readable storage medium of claim 23, wherein the user interface includes an auto-fill function that provides options of alias names for selection, and each of the options of alias names provided are alias names received from the switch in response to the request and cached in the database of the storage array.

* * * * *